3,382,161
ELECTROLYTIC SEPARATION OF TRANSITION METAL OXIDE CRYSTALS
Walter Kunnmann, Port Jefferson Station, N.Y., and August Ferretti, Cambridge, Ronald J. Arnott, Waltham, and Donald B. Rogers, Forge Village, Mass., assignors to the United States of America as represented by the United States Atomic Energy Commission
No Drawing. Filed May 3, 1965, Ser. No. 452,948
6 Claims. (Cl. 204—61)

This invention is related to a method of growing crystals. More particularly it is related to a method of growing large well formed, stoichiometric single crystals of mixed oxides of the transition metal elements.

Crystals of the transition metal oxides such as $Y_3Fe_2(Fe_2O_4)_3$ have been found to have important use in the microwave (radar) field. Various crystals of transition metal oxides have been found useful as lasers and masers in the communication field.

The growth of large crystals of transition metal oxide is difficult because the melting points of many of these compounds are higher than the dissociation temperature of the transition metal oxides such as ferric oxide in oxygen at atmospheric pressure. The chromite series of transition metal oxides, while usually quite stable, have extremely high melting points (approx. 2000° C. and greater) thus creating the problem of finding a container that is both inert and capable of withstanding such temperature. The vanadite series requires that vanadium be in a lower than normal valence state, necessitating an atmosphere such as carbon monoxide-carbon dioxide to maintain stoichiometry. In addition, there is considerable doubt as to the stability of vanadites at the elevated temperatures that would be required in a direct synthesis of single crystals from the melt.

The growth of large crystals of transition metal oxides has heretofore been considered an empirical art. To circumvent all of the difficulties inherent in direct crystallization methods, the art has resorted to growing such crystals in a flux system, wherein the transition metal oxides in a powdered form are dissolved in a solvent at relatively low melting points in comparison to the melting point of the transition metal oxides and thereafter are caused to be precipitated out of the flux in the form of a crystal. Heretofore no one predictable flux system was available to the art from which crystals of all transition metal oxides could be formed. An adequate flux system for crystal growth of a particular transition metal oxide was found by trial and error, and the conditions for crystal growth were found to be unique for each system.

It is an object of this invention to provide those skilled in the art with a new and improved method of growing crystals of transition metal oxides.

It is a further object of this invention to provide those skilled in the art with a new and improved method of growing large well formed stoichiometric single crystals of mixed oxides of the transition metal elements.

It is a further object of this invention to provide those skilled in the art with a new and improved flux system in which transition metal oxides can be dissolved at relatively low temperatures in comparison to the normal melting points of the oxides.

Other objects of this invention will in part be obvious and will in part appear hereinafter.

It has been discovered that the foregoing objects are readily accomplished by a method for growing large well formed stoichiometric single crystals of mixed oxides of the transition metal oxides comprising heating a transition metal oxide containing flux mixture to the molten state, said mixture containing at least 10 mol percent of transition metal oxides based on the total number of mols present in the mixture, the balance of said flux mixture being made up of a flux composed of sodium pyrotungstate and sodium tungstate wherein the mol ratio of sodium pyrotungstate to sodium tungstate is less than 0.11; thereafter precipitating the transition metal oxide out of the molten mixture as a crystal by decreasing the solubility of the transition metal oxide in the flux.

Transition metal elements found usable in our invention are those members of several groups of elements in the periodic table having an incomplete inner shell; e.g. iron, where only 6 electrons out of the 10 possible $3d$ electrons and yet has 2 electrons in the $4s$ state. Such elements are well known to those skilled in the art.

The transition metal oxides of our invention may be made up of either a pure transition metal oxide e.g., yttrium-iron-garnet, and/or mixtures of various transition metal oxides.

It will be obvious to those skilled in the art that certain of the transition metal oxides such as oxides of the noble metals, e.g. gold, platinum, mercury etc., would be unstable under the normal temperatures and pressures employed in the practice of this invention. Of course this basic instability can be compensated for by the use of thermodynamical conditions which are well known to those skilled in the art. Thus all transition metal oxides can be utilized in the practice of our invention.

Fundamentally the polytungstate flux system can be described in terms of Lewis acid-base theory in that basic oxides are dissolved by a strong Lewis acid ($WO_3$) and then reprecipitated by a strong Lewis base ($Na_2WO_4$). This process of solution and precipitation is carried out by utilizing the equilibrium as expressed by Equation I $$Na_2W_2O_7(l) \rightleftharpoons Na_2WO_4(l) + WO_3(l)$$

Sodium pyrotungstate ($Na_2W_2O_7$) is relatively stable compound at low temperatures, dissociating only slightly into the acid-base components. As the temperature increases, the equilibrium is shifted rapidly toward the right as described by Equation I. Consequently, at higher temperatures more acid is produced to dissolve the transition metal oxides as complex tungstates, the process reversing as the temperature decreases. The only requirements for solubility of a particular transition metal oxide (or mixed oxide) at a temperature T are the following:

(1) A complex tungstate of the transition metal oxide must exist at T that is at least partially soluble in the flux system.

(2) It must be possible to establish at T an equilibrium reaction by which the complex tungstate is formed through reaction of the metal oxide and a finite amount of sodium pyrotungstate.

Although the actual reactions occurring in the solution process are undoubtedly quite complex, the following considerations provide a qualitative understanding of the process.

The solubility requirements imply the existence of an equilibrium reaction at T of the type—Equation II $$a\text{MeO}(s) + b\text{Na}_2\text{W}_2\text{O}_7(l) \rightleftharpoons a\text{MeO} \cdot n\text{WO}_3(s, l) + (b-na)\text{Na}_2\text{W}_2\text{O}_7(l) + na\ \text{Na}_2\text{WO}_4(l)$$

where $\text{MeO} \cdot n\text{WO}_3(s, l)$ is a partially soluble complex tungstate of a transition metal oxide MeO. It is evident from Equation II that if $a$ moles of a transition metal oxide are added to a flux of composition $$(1-x)\text{Na}_2\text{W}_2\text{O}_7 = x\text{Na}_2\text{WO}_4$$

at temperature T, there exists a value of $x(x_c)$ above which the only solid phase which may exist in equilibrium with the solution is the transition metal oxide. The amount of this solid phase present at equilibrium will, of course, increase as the difference $x-x_c$ increases. Below $x_c$ various polytungstate phases will be in equilibrium with the solution. Since the appearance of solid polytungstate phases for $x<x_c$ indicates a sufficiently high concentration of $WO_3$ to exceed the solubility product of the complex tungstate, it is apparent that maximum solubility of the oxide at T can be expected by operating as close to $x_c$ as is feasible. Furthermore, it is anticipated that the value of $x_c$ will increase as the relative basicity of the oxides increases and will be larger for alkali and alkaline earth oxides.

The temperature dependence of the equilibrium expressed by Equation I is reflected in the equilibrium of Equation II. Thus, if a flux composition is chosen for which $x=x_c+\Delta x$ at temperature T, the amount of solid oxide in equilibrium with the solution will decrease as the temperature is raised to $T+\Delta T$. This dissolved oxide may then be reprecipitated at any desired rate on subsequent cooling. Slow rates of cooling are desirable for the growth of large single crystals.

Example I

The sodium pyrotungstate-tungstate system has been used as a flux for single crystal growth of numerous mixed oxides of the transition metals. The flux compositions, operating temperatures and other imposed conditions are outlined in Table I for several chromite spinels $$(M^{+2}Cr_2O_4)$$

ferrite spinels ($M^{+2}Fe_2O_4$), and for the garnet $Y_3Fe_5O_{12}$. Application of these conditions for the growth of a particular crystal can be illustrated by the case of cobalt chromite. In a typical experiment, 0.90 mole of cobalt carbonate, 0.90 mole of anhydrous $Cr_2O_3$, 0.60 mole of anhydrous $Na_2WO_4$, and 0.375 mole of anhydrous $WO_3$ were thoroughly mixed and placed in a 250 cc. platinum crucible with a tightly fitted cover. The crucible was then placed in a furnace and the temperature raised slowly to 1450° C. The temperature was maintained at 1450° C. for a period of at least 12 hours. After this initial soaking period, the temperature was decreased at the rate of 3° C. per hour until 1000° C. had been reached. At 1000° C. the furnace was turned off and allowed to cool rapidly to room temperature. Numerous well-formed crystals of $CoCr_2O_4$, which float on the surface of the dense melt, were then easily removed from the flux by leaching in a concentrated solution of sodium hydroxide.

For the determination of the critical value of $x(x_c)$ in the formula $(1-x)Na_2W_2O_7=xNa_2WO_4$ as applied to a particular system, various molar ratios of transition metal oxide, sodium pyrotungstate and sodium tungstate were fused together for 6–12 hours at 1000° C.–1100° C. in a platinum crucible (with tightly fitting cover) that was sealed in a fused quartz ampoule under an inert atmosphere. After reaching for the prescribed time the samples were quenched to room temperature, ground, and examined by X-ray diffraction techniques.

TABLE I.—Initial Flux Composition in Mole Fractions

| Compound | Cmpnd. | $Na_2W_2O_7$ | $Na_2WO_4$ | Initial Temp., °C | Rate of Cooling, °C./hr. | Atmosphere |
|---|---|---|---|---|---|---|
| $CoCr_2O_4$ | 0.60 | 0.25 | 0.15 | 1,450 | 3 | Air. |
| $MnCr_2O_4$ | 0.40 | 0.30 | 0.30 | 1,250 | 5 | Argon-$H_2H_2O$ |
| $ZnCr_2O_4$ | 0.40 | 0.20 | 0.40 | 1,250 | 5 | $N_2$ |
| $CoFe_2O_4$ | 0.38 | 0.145 | 0.475 | 1,340 | 25 | Air. |
| $MgFe_2O_4$ | 0.38 | 0.145 | 0.475 | 1,300 | 2 | Air. |
| $Y_3Fe_2(FeO_4)_3$ | 0.10 | 0.21 | 0.69 | 1,300 | 3 | Air. |

The data of Table I indicate the effectiveness and versatility of the $Na_2W_2O_7$-$Na_2WO_4$ flux system in single crystal synthesis. The crystals obtained when using the temperature cycles reported are usually several millimeters on edge. Larger ones could presumably be obtained by refinements of the rather simple growth techniques known to those skilled in the art. In principle, any of the alkali metal pyrotungstates or pyromolybdates could be substituted for the sodium pyrotungstate fluxes described in this paper. However, the high vapor pressure of $MoO_3$ above 600° C. and the observations that lithium and potassium have a greater tendency to crystallize as contaminants in the spinel lattice are serious disadvantages for such substitutions. Certain of the crystals grown from sodium pyrotungstate-tungstate fluxes have been analyzed by spectrographic techniques and found to contain no detectable flux contaminants.

With reference to the data of Table I, it is seen that up to a critical concentration of sodium pyrotungstate, a simple ternary system is formed between the components. It should be noted that this critical concentration is relatively independent of the concentration of transition metal oxide.

Example II

Cobalt vanadite crystals $$\left(Co_{1+\delta}V^{+3}_{2-2\delta}V^{+4}_{\delta}O_4\right)$$

where $\delta$ can have any value ranging from 0 to 1 and in this example the value for $\delta$ in each run is given in Table I. 1 mol of cobaltous oxide (CoO) powder, 1 mol of powdered sodium tungstate ($Na_2WO_4$), 0.7 mol of powdered sodium pyrotungstate ($N_2W_2O_7$) were intermixed in a platinum crucible and the crucible equipped with two platinum electrodes which electrodes were insulated from the crucible and in contact with the material in the crucible. The entire assembly was heated to 900° C. at which point the flux mixture in the crucible was in the form of a melt, electrolysis was done under a current density of 10 milliamperes per sq. cm. on the cathode. Crystals of cobalt vanadite deposited on the cathode almost instantaneously with the commencement of electrolysis and the electrolysis was carried on for a period of approximately one week after which the crystals were separated from the flux mixture and leached with an NaOH solution. The value of $\delta$ obtained in this run was 0.54. The crystals were well formed and found to be free of flux contaminants.

The following table gives the values for 3 other runs which were performed in accordance with the procedure of this example.

TABLE II

| Mols of CoO | Mols of $V_2O_5$ | Mols of $Na_2WO_4$ | Mols of $Na_2W_2O_7$ | $\delta$ |
|---|---|---|---|---|
| 1 | 1 | 3.2 | 0.396 | 0.38 |
| 1 | 1 | 3.6 | 0.201 | 0.22 |
| 1 | 1 | 4.0 | 0.0 | 0.11 |

Thus it will be obvious to those skilled in the art that our novel process provides an efficient economic method of producing well formed, highly purified crystals of the transition metal oxides. The removal of the crystals from the molten flux mixtures can be effectuated by any of the techniques well known to those skilled in the art, e.g., by allowing the melt to slowly cool electrolysis, etc.

We claim:
1. A process for growing crystals of transition metal oxides comprising:
   (a) heating a transition metal oxide containing flux mixture to the molten state, said mixture containing at least 10 mol percent of transition metal oxides based on the total number of mols present in the mixture, the balance of said flux mixture being made up of flux containing sodium pyrotungstate and so- dium tungstate wherein the mol ratio of sodium pyrotungstate to sodium tungstate is less than 0.11;

(b) precipitating the tungsten metal oxide out of the molten mixture as a crystal.

2. The process of claim 1, wherein said precipitation of the crystals is effectuated by cooling the flux mixture.

3. The process of claim 1, wherein said precipitation of the crystals is effectuated by electrolytic separation.

4. The process of claim 2 wherein said precipitated crystals are purified by contacting the precipitated crystals with an alkaline aqueous solution.

5. The process of claim 3 wherein said precipitated crystals are purified by contacting the precipitated crystals with an alkaline aqueous solution.

6. A flux mixture for the growth of crystals of the transition metal oxides comprising:

(a) at least 10 mol percent of transition metal oxides based on the total molar quantities of materials present in the flux mixture;

(b) the balance of said mixture being made up of a flux containing sodium pyrotungstate and sodium tungstate, wherein the mol ratio of sodium pyrotungstate to sodium tungstate is between 0 and 0.11.

References Cited

Carlston, R. C., "Crystal Chemistry of Some Transition Metal Oxide Systems," Norelco Reptr. 10, No. 1, 8–10 (1963).

Harrison, F. W., "Growth of Oxide Single Crystals Containing Transition Metal Ions," Research (London), 12, 395–403 (1959).

JOHN H. MACK, *Primary Examiner.*

D. R. VALENTINE, *Assistant Examiner.*